F. G. SIMPSON.
WIRELESS TELEGRAPH APPARATUS.
APPLICATION FILED NOV. 18, 1913.

1,258,157.

Patented Mar. 5, 1918.

WITNESSES:
E. Peterson
James E. Sproll

INVENTOR
Frederick Grant Simpson
BY
Pierre Barnes
ATTORNEY

UNITED STATES PATENT OFFICE.

FREDERICK GRANT SIMPSON, OF SEATTLE, WASHINGTON.

WIRELESS-TELEGRAPH APPARATUS.

1,258,157.

Specification of Letters Patent.   Patented Mar. 5, 1918.

Application filed November 18, 1913. Serial No. 801,570.

*To all whom it may concern:*

Be it known that I, FREDERICK GRANT SIMPSON, a citizen of the United States, residing at Seattle, in the county of King and State of Washington, have invented certain new and useful Improvements in Wireless-Telegraph Apparatus, of which the following is a specification.

This invention relates to wireless telegraph apparatus and its object is the improvement in such apparatus to render the same more efficient.

The invention includes a transformer having peculiar windings for the purpose of transforming alternating currents of a relatively low potential to similar currents of a much higher potential. In the present invention the produced high potential current is utilized for charging a condenser to a predetermined potential, whereupon the current is discharged through a circuit having an inductance and a spark-gap. Furthermore, by the employment of my improved method of winding a transformer, there is produced an extremely low magnetizing current with certain voltage-regulating characteristics which assist in the quenching of the spark at the above-mentioned spark-gap subsequent to one or two oscillations of the current in a circuit which is either directly or inductively coupled with the circuit containing the condenser, the spark-gap and the referred-to inductance to oscillate in the natural period of the circuit so coupled.

The invention is illustrated in the accompanying drawings, wherein—

Figure 1:
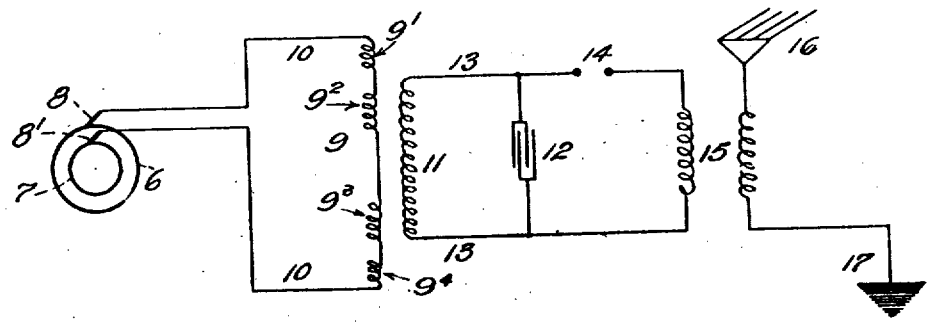
Figure 2:
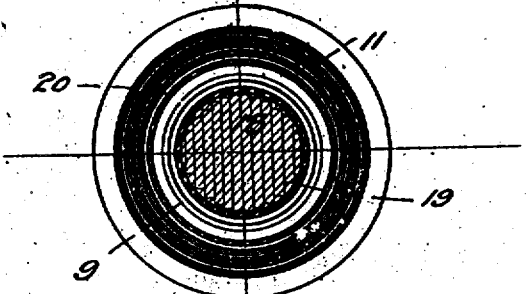

Figure 1 is a diagrammatic representation of a wireless transmitting system with my improvements applied therein. Fig. 2 is a transverse sectional view of a portion of a transformer embodying features of my invention, and Fig. 3 is a longitudinal sectional view of the same.

Referring to Fig. 1, 6 and 7 are collector rings mounted on the shaft of an alternating current generator, and electrically connected to the armature winding as shown. 8 and $8^1$ are brushes bearing on said collector rings, and are connected to the primary winding 9 of a transformer through the leads 10. 11 is a secondary winding of said transformer which is connected to the terminals of a condenser 12, through the leads 13. 14 is a spark-gap, and 15 is an oscillating current transformer inductively coupling the antenna 16, which is grounded at 17, to the closed oscillating circuit consisting of condenser 12, spark-gap 14, and secondary 11 of the afore-mentioned transformer.

Figure 3:
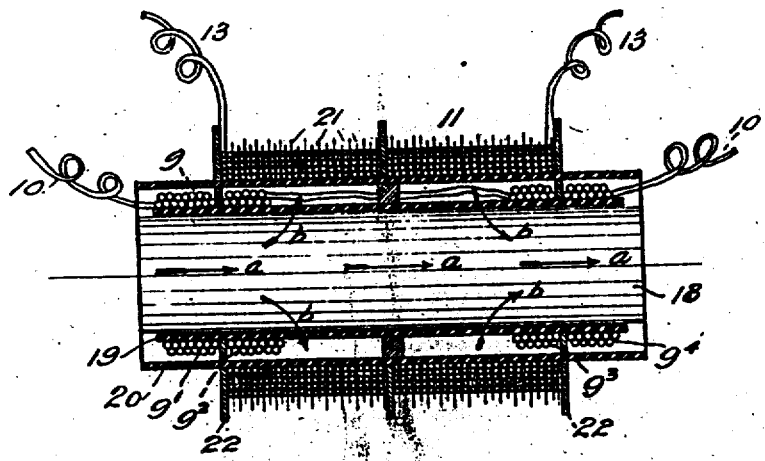

The transformer shown in Figs. 2 and 3 is provided with a laminated core 18 of sheet steel or other magnetic material surrounding which is a tube 19 of insulating material to receive the aforesaid primary winding 9. Inclosing the latter is a second tube 20 of insulating material for secondary winding 11 which is interposed between annular insulator elements 21.

In an open core transformer of the type shown, the ratio of the electro-motive force between the terminals of the primary circuit to the electro-motive force between the terminals of the secondary circuit, it may be said, is not the ratio of the number of turns of the primary circuit to the number of turns of the secondary circuit, as is closely approached in a closed core transformer, but is dependent upon the capacity, inductance and mutual inductance between primary and secondary circuits. This quantity can be determined from the following formula:—

$$E_2 = \frac{\sqrt{E_1^2 C_1^2 - I_1^2(L_1 C_1 - L_2 C_2)^2}}{2\sqrt{C_1 C_2}}$$

in which $E_2$ represents the secondary electro-motive force; $E_1$ primary electro-motive force; $C_1$ total capacity in the primary circuit, including the distributed capacity in the transformer primary winding and leads, and in the alternating current generator windings; $C_2$ total capacity of the secondary circuit, including the distributed capacity in the transformer secondary winding, leads and the capacity of the condenser 12; $L_1$ the total inductance in the primary circuit, including the inductance in the transformer primary winding, leads and the synchronous inductance of the alternating current generator; $L_2$ the inductance in the secondary circuit, including the inductance in the secondary transformer winding, leads and in the condenser; $I_1$ the current flowing in the primary circuit.

It will be noted from the above formula that if the primary and secondary circuits have the same natural periods, and that if they are resonant circuits, the quantity $I_1^2(L_1 C_1 - L_2 C_2)^2$ becomes equivalent to zero, and that the ratio of primary to secondary electro-motive force is proportional to the ratio of the primary to the secondary capacity.

Preferably, the size of the condenser 12, is determined by the required capacity in kilowatts of the transmitting station, by. the frequency of the alternating current generator and desired electro-motive force at which it is required that the condenser shall discharge through spark-gap 14. The inductance of the secondary winding 11 is so proportioned as to make the circuit consisting of said winding, leads 13 and condenser 12 a resonant circuit of the frequency of the alternating current generator.

The inductance and capacity of the primary 9 of the transformer is determined as shown in the above formula, and when so determined is found in practice to require a minimum magnetizing current to produce inductively the required electro-motive force between the terminals of the secondary winding 11.

As illustrated in Figs. 1 and 3, the primary winding 9 is separated into four members $9^1$, $9^2$, $9^3$, and $9^4$. While this winding may be separated into any number of members above two, I prefer the employment of four members which are arranged in two spaced pairs and series connected, shown, as $9^1$, $9^2$ and $9^3$, $9^4$. The members of each pair are separated by annular insulating disks, or partitions 22 as shown. The secondary winding is concentric with and preferably surrounds portions of the primary winding $9^2$ and $9^3$ as shown for example, in Fig. 3. By this arrangement of the primary winding on the core, that leaves the central portion of the core devoid of winding, there is produced, or provided, a leakage path, through which the magnetic lines of the primary are caused to pass after having been distorted by the action of the secondary field thereon.

When a current, such as one of an alternating character, having changing values, is passed through the primary winding, the inertia of self-induction must be overcome, after which there is produced in the core a flux of magnetic lines that will be caused to pass through the core from end to end.

At some particular instant, magnetic poles are formed at the extremities of the core by the primary winding. such as north and south, magnetic poles, when the direction of the lines in that instant will be that shown by the arrows $a$. With a current flowing in the primary, these lines leave the north pole, pass into the air, then bend backward to reach the south pole where they reënter the core. In bending backward through the air they spread out somewhat, as is well known, and if a secondary be wound over the primary, these lines will cut the secondary winding and a current will be induced in the opposite direction, or sense, to that of the primary or inducing current; the magnitude depending on the formula previously given.

By arranging the primary winding near the outer ends of the core 18, and winding the secondary over portions of the primary, to thereby surround those portions, a control is thus obtained over the maximum current induced in the secondary.

Every conductor carrying a current creates a magnetic field around itself whether it is embedded in iron or lies in air. Such being the case, the magnetic fields created around the several turns and layers of the secondary will interfere with the primary field and the induction lines passing through the core. This interference results in the lateral dispersion of the primary flux and also a choking effect is obtained that will further diminish the flux. This secondary flux around the central portion of the core, practically, does not link with any of the turns of the primary and therefore constitutes a leakage flux also, from the fact of there being no linkage. The field thus established in and around the central portion of the core 18, increases the magnetic reluctance of that portion, as well as by apparently lessening the permeability of the core. It is this disposition of the secondary field with reference to the primary winding that produces the distorting and choking action on the primary flux and current. This is further augmented by the turns of the secondary where they surround the primary as the primary leakage increases. The secondary flux links with the distorted primary flux and also acts as a true self-induction and thus further tends to choke the primary current.

The effect of there being a coefficient of mutual induction between the two circuits, is to diminish the self-induction of each of them separately and as their convolutions are wound around the same core, in a geometrical relation, the effect of their mutual induction is to annul the separate self-inductions. Any unbalanced self-induction in either circuit, such as is obtained by the effect of the secondary, will necessarily tend to make that circuit act as a choking coil; and any magnetic leakage will thus act as an unbalanced self-induction. By this changing condition of the mutual inductance, the primary flux lines $a$, will have their direction changed to that shown by the arrows $b$. Leakage also causes a proportional increase in the apparent self-induction of both primary and secondary circuits, as well as an equivalent lag of the currents. The lines leave the core 18, as shown by the leaving arrows $b$, pass outwardly and around the central portion of the core, where the greater reluctance exists, and reënter the core, as shown by the entering arrows $b$, in order to pass to the opposite polar extremity, by means of the core. Some of the lines may pass through the core.

At some given instant of time, the distorted or leakage flux shown by the arrows $b$ passes in one direction, that is, from end to end, and at the same given instant of time, the secondary field, which surrounds the central portion of the core, is opposite in direction to and opposes the primary field. This opposing flux of the secondary winding being created by a growing current, produces in the core the effect by which the primary induction lines are bent out laterally, by producing a magnetic field which has polarity in the central portion of the core. The polarity of the lines of the primary field is not changed by the secondary field, nor is the general direction of the lines from end to end, changed at any given instant. To maintain a definite direction of the lines the members $9^1$, $9^2$, $9^3$ and $9^4$, are preferably connected in series to produce a definite polarity in the core 18 at some given instant of time. These lines are simply bowed or bent out laterally around the central portion of the core.

There being always some lateral leakage, this method of winding the primary near the ends of the core and winding the secondary to surround portions of the primary, exaggerates and produces the effect described. Most of these lines are not able to pass through the core from end to end; they expand through the leakage path, pass around the point of greatest reluctance, and continue their direction to reënter the core at a point where the reluctance is less.

If a unit north-pole be placed at any point in a long solenoid, there will be $4\pi$ lines of induction radiating out from this unit point-pole, independent of the nature of the medium within the solenoid. If the diameter be small as compared with its length, practically all of the $4\pi$ lines of induction which radiate out from this unit pole will pass through the lateral walls of the solenoid.

These primary induction lines bending outward, cut some of the turns of the secondary winding, increasing the induced current, thus increasing the magnitude of the secondary field, and its resultant effect on the primary and the core.

With an alternating-current passing through the solenoid, this becomes more evident than with the pulsating direct-current. When an alternating-current is passing through a complete cycle in a solenoid, the movement of the current through the coil is progressive from point to point.

The magnetizing effect of the secondary is proportional to the initial strength of the induced current, and this initial strength is proportional to the value of the ratio of the coefficient of mutual induction to the coefficient of self-induction of the secondary. Thus the combined effect is to cause the lines to bend or spread out laterally around the central portion of the core.

This lateral dispersion of the magnetic lines being produced to an extraordinary degree, thereby changes the mutual inductance between the two windings. The resistances, reactances, and the magnetic permeability of the core are varied, causing the impedances also to vary, and automatically producing a momentary lowering of the induced E. M. F. in the secondary, when the current induced is a maximum.

When a condition of resonance is attained the current through the secondary is then a maximum. Immediately following this resonant condition, the automatic action of the transformer lowers the induced E. M. F., and prevents the formation of an arc across the spark-gap. The E. M. F. is reduced to such an extent that it will not maintain an arc. The condition of arcing is undesirable for wireless transmission work, as good oscillations are not produced. As a maximum current normally flows through the secondary during the discharge of the condenser across spark-gap 14, this automatic action of the transformer has a tendency to, and does, reduce the current during that interval, by the lowering of the potential between the terminals of the secondary winding, and materially assists in the quenching of any arc which might form across the spark-gap, and also in the quenching of the spark due to the condenser discharge across said spark-gap after the first few oscillations. With the spark quenched, no current flows in the circuit which includes the condenser, the spark-gap and the primary of the oscillating current transformer 15; this circuit having previously been tuned to resonance with the circuit consisting of antenna 16, secondary of oscillating transformer 15 grounded at 17. This latter circuit which is the open or radiating circuit in a wireless transmitting system of the kind shown, will therefore oscillate in its own period without interference from the closed oscillating circuit.

Signals are transmitted by opening and closing, or in otherwise varying the constants of the primary winding 9, of the transformer, or in any other way of varying the charge or discharge of condenser 12.

Having described my invention, what I claim, is—

1. A transformer comprising a core, a primary winding composed of spaced coils and disposed by groups near the outer ends of said core, a secondary winding surrounding a portion of each group to create a magnetic field in and around said core for producing a lateral leakage of the magnetic lines, the remaining portions of each group being disposed adjacent to and exterior of the secondary.

2. A transformer comprising a core, a primary winding and a secondary winding thereon, said secondary winding inclosing a portion of the primary winding and surrounding the central portion of the core to produce a choking effect on the magnetic flux passing through that portion of the core when a current flows in the secondary and operating to produce a lateral dispersion of the magnetic lines of induction caused by the primary winding.

3. A transformer comprising a core, a plurality of coils disposed near the ends thereof, and another plurality of coils arranged concentrically with and to surround the inner portions of the first plurality of coils to provide a leakage path within the transformer through which the magnetic lines pass when laterally dispersed.

4. A transformer comprising a core, a plurality of spaced groups of side-by-side series connected coils thereon, each group being arranged near the outer ends of the core, and a secondary winding adapted to surround a plurality of coils of different groups, the remaining coils of said groups being disposed adjacent to and exterior of the secondary.

5. A transformer having a magnetizable core element, and a plurality of windings, one of said windings comprising a plurality of groups of coils, one of said groups being separated from another of said groups, the groups being so disposed on said core as to lie partly within and partly without the outer winding so as to be partly inclosed by said other winding.

6. A transformer for wireless telegraph systems comprising a core element, a secondary element having terminals, and a spaced primary element disposed on the core and surrounded by a part of the secondary element whereby when a maximum current is induced in the secondary element, the lateral leakage of the magnetic field in the interior of the transformer is a maximum, the maximum current then contributing to produce a momentary extinguishment of the entire magnetic field, and thus lower the E. M. F. to a value that is unable to maintain an arc across the secondary terminals.

7. A transformer comprising a core element, a primary winding consisting of a plurality of spaced apart groups of coils arranged near the outer ends of said core, one of said groups of coils being separated from another group to provide a leakage path within the transformer between said groups, a secondary winding adapted to coöperate with said core and partly inclose said primary winding, and means to insulate said windings from each other and from said core.

8. A transformer for wireless telegraph systems comprising a core element, a secondary element provided with terminals, and a primary element composed of spaced apart portions partly disposed within the secondary and on the core to form a leakage path within the transformer from the central portion of said core, the leakage increasing as the current induced in the secondary increases, so that when the maximum current exists in the secondary, the mutual inductance is varied and the induced E. M. F. is momentarily lowered to prevent an excessive current from flowing between the terminals of the secondary at discharge.

9. A transformer having a cylindrical magnetizable core element, a primary winding and a secondary winding arranged concentrically with relation to said core, said primary being subdivided into a plurality of spaced groups of coils which are disposed near the outer ends of said core, one group being separated from another group so that a portion of each group projects from within the interior of, and is partly surrounded by, the secondary winding thereon, said secondary being composed of a greater number of turns than the primary, so that when the current induced in the secondary reaches a maximum, the magnetic field created thereby causing a momentary extinguishment of both magnetic fields.

10. A transformer comprising a core element, a primary winding and a secondary winding to coöperate therewith, said primary being subdivided into a plurality of coils which are arranged near the outer ends of said core, a portion of said coils being axially displaced with relation to each other and exterior of the secondary, and another portion of said coils spaced and disposed within the secondary.

Signed at Seattle, Wash., this 7th day of November, 1913.

FREDERICK GRANT SIMPSON.

Witnesses:
PIERRE BARNES,
CHARLES A. KILBOURNE.